(12) United States Patent
Marena et al.

(10) Patent No.: US 9,009,379 B1
(45) Date of Patent: Apr. 14, 2015

(54) COMMUNICATING WITH MIPI-COMPLIANT DEVICES USING NON-MIPI INTERFACES

(71) Applicant: Lattice Semiconductor Corporation, Hillsboro, OR (US)

(72) Inventors: Teodoro Marena, San Jose, CA (US); Grant Jennings, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 14/223,096

(22) Filed: Mar. 24, 2014

Related U.S. Application Data

(63) Continuation of application No. 14/220,377, filed on Mar. 20, 2014.

(60) Provisional application No. 61/925,792, filed on Jan. 10, 2014.

(51) Int. Cl.
*G06F 13/42* (2006.01)

(52) U.S. Cl.
CPC .................................. *G06F 13/4286* (2013.01)

(58) Field of Classification Search
CPC .................................. G06F 1/10; G06F 13/28
USPC .......................................... 710/105, 306, 308
See application file for complete search history.

(56) References Cited

U.S. PATENT DOCUMENTS

| | | | | |
|---|---|---|---|---|
| 7,737,747 B2 * | 6/2010 | Kamath | ......................... | 327/170 |
| 8,184,026 B2 * | 5/2012 | Kim et al. | ...................... | 341/100 |
| 8,618,879 B2 * | 12/2013 | Mizokami et al. | ............ | 330/136 |
| 8,781,432 B2 * | 7/2014 | Kettunen et al. | .............. | 455/333 |
| 8,816,726 B1 * | 8/2014 | Lee | ................................. | 327/108 |
| 8,886,988 B2 * | 11/2014 | Lin et al. | ....................... | 713/503 |

OTHER PUBLICATIONS

Texas Instruments—"MIPI DSI Bridge to eDP", Dated Sep. 2013, 68 pages.*
Lattice Semiconductor—"News Release—Lattice Just Made It Easier for OEMs to Introduce the Latest in MIPI Camera and Display Capabilities", Dated Aug. 28, 2013, 2 pages.*
Toshiba, "TC358746 MIPI CSI-2 Camera Bridge IC", Dated Oct. 2011, 2 pages.*
Synopsys, Inc. "DesignWare MIPI D-PHY IP," Datasheet, 2011, www.synopsys.com, (2 pages).

(Continued)

*Primary Examiner* — Brian Misiura

(57) ABSTRACT

Using relatively inexpensive, external resistor networks, an electronic device, such as an FPGA, can be configured to use non-MIPI interfaces to communicate with one or more MIPI-compliant devices, such as video sources (e.g., cameras) and sinks (e.g., displays). High-speed (HS) and low-power (LP) MIPI signaling for each MIPI clock/data lane is supported by a set of one or more non-MIPI interfaces, such as LVDS and/or LVCMOS receivers, transmitters, and/or transceivers, and an appropriate, corresponding, external resistor network. For configurations in which the resistor-configured electronic device can handle high-speed MIPI data from a MIPI-compliant device, the electronic device can detect transitions in the MIPI mode of the MIPI-compliant device. In some configurations, the resistor-configured electronic device can provide high-speed MIPI data to a MIPI-compliant device. In either case, the electronic device configures the non-MIPI interfaces to support the current MIPI HS/LP mode.

30 Claims, 5 Drawing Sheets

(56) References Cited

OTHER PUBLICATIONS

Lattice Semiconductor Corp. "MIPI D-PHY Interface IP," Reference Design RD1182, Jul. 2013, www.latticesemi.com, pp. 1-22.
Meticom GmbH "Complete FPGA-Based MIPI Video Demonstration System Now Available," 2013, (3 pages).
MIPI Alliance, Inc. "MIPI Alliance Launches M-PHY v2.0 + UniPro v1.41 Specifications," Physical Layer Specifications, 2013, www.mipi.org/specifications/physical-layer; pp. 1-4.
Lattice Semiconductor Corporation, "MIPI CSI2-to-CMOS Parallel Sensor Bridge," Reference Design RD1146, Dec. 2012, www.laticesemi.com, pp. 1-4.

* cited by examiner

COMMUNICATING WITH MIPI-COMPLIANT DEVICES USING NON-MIPI INTERFACES

CROSS-REFERENCE TO RELATED APPLICATIONS

This application is a continuation of U.S. application Ser. No. 14/220,377, filed Mar. 20, 2014, which claims the benefit of the filing date of U.S. Provisional Application No. 61/925,792, filed Jan. 10, 2014, both of which are incorporated herein by reference in their entirety.

BACKGROUND

1. Field of the Invention

The present invention relates to electronics and, more specifically but not exclusively, to electronic devices communicating using signals conforming to the Mobile Industry Processor Interface (MIPI) specification.

2. Description of the Related Art

This section introduces aspects that may help facilitate a better understanding of the invention. Accordingly, the statements of this section are to be read in this light and are not to be understood as admissions about what is prior art or what is not prior art.

The Mobile Industry Processor Interface (MIPI) differential physical (D-PHY) specification dictates the signaling supported by a MIPI-compliant device. According to the MIPI specification, a MIPI D-PHY interface alternately supports two different modes of operation over a single wire pair: a high-speed (HS) mode involving unidirectional (i.e., transmit (TX) or receive (RX)) differential SLVS200 signaling and a low-power (LP) mode involving bidirectional 1.2V CMOS signaling. Depending on the particular application, a MIPI-compliant device may use a MIPI D-PHY interface, where a D-PHY interface consists of one clock lane and anywhere from one to four data lanes configured to communicate with another MIPI-compliant device using the same number of lanes.

Some existing devices, such as certain Field Programmable Gate Arrays (FPGAs), are provisioned with certain physical interfaces, but not any MIPI D-PHY interfaces. For example, certain FPGAs have 2.5V LVDS PHYs and 1.2V, 2.5V, and 3.3V LVCMOS PHYs, but no MIPI D-PHY interfaces. Other devices, include FPGAs, may have some MIPI D-PHY interfaces, but not enough to support all of the desired different communications.

FIG. 1 shows a high-level block diagram of a prior-art electronic system 100 having an FPGA 130 that uses non-MIPI-compliant interfaces to communicate with a MIPI-compliant camera 110 and a MIPI-compliant display 150. For the exemplary configuration of FIG. 1, it is assumed that FPGA 130 has no MIPI-compliant interfaces. In other configurations, FPGA 130 might have some, but not enough MIPI-compliant interfaces to support the communications of FIG. 1. In this particular configuration, each of camera 110 and display 150 has one MIPI D-PHY consisting of one clock lane and one data lane. To enable such communication, system 100 has (i) two MIPI-to-non-MIPI converter chips 120 configured between camera 110 and FPGA 130 and (ii) two non-MIPI-to-MIPI converter chips 140 configured between FPGA 130 and display 150.

Although, in the particular configuration shown in FIG. 1, camera 110 has one MIPI data lane 112(1) and one MIPI clock lane 112(2), and display 150 also has one MIPI data lane 142(1) and one MIPI clock lane 142(2), in general, MIPI-compliant devices can have one clock lane and up to four data lanes for each set of MIPI D-PHY communications. To support such full-bandwidth MIPI communications with FPGA 130, the prior-art electronic system would need up to three more instances of MIPI-to-non-MIPI converter 120 and up to three more instances of non-MIPI-to-MIPI converter 140.

Although FPGA 130 of FIG. 1 has no MIPI D-PHYs, it does have (i) LVDS circuitry 132 including LVDS PHYs and internal circuitry capable of processing LVDS signals and (ii) CMOS circuitry 134 including CMOS PHYs and internal circuitry capable of processing CMOS signals. For the data signals, MIPI-to-non-MIPI converter chip 120(1) converts between (i) MIPI-compliant data signals on a first wire pair 112(1) and (ii) LVDS-compliant data signals on a second wire pair 122(1) and CMOS-compliant data signals on a third wire pair 124(1). Similarly, for the clock signals, MIPI-to-non-MIPI converter chip 120(2) converts between (i) MIPI-compliant clock signals on a first wire pair 112(2) and (ii) LVDS-compliant clock signals on a second wire pair 122(2) and CMOS-compliant clock signals on a third wire pair 124(2).

When camera 110 is operating in the MIPI HS mode, the LVDS-compliant data and clock signals on wire pairs 122(1) and 122(2) are relevant, while the CMOS-compliant data and clock signals on wire pairs 124(1) and 124(2) can be ignored. Alternatively, when camera 110 is operating in the MIPI LP mode, the LVDS-compliant data and clock signals can be ignored, while the CMOS-compliant data and clock signals are relevant. In this way, FPGA 130 can communicate with camera 110 no matter what is the MIPI mode of camera 110. Note that, for this particular application, MIPI HS mode involves only unidirectional differential SLVS200 signaling transmitted from camera 110.

Analogously, for the data signals, non-MIPI-to-MIPI converter chip 140(1) converts between (i) LVDS-compliant data signals on a first wire pair 136(1) and CMOS-compliant data signals on a second wire pair 138(1) and (ii) MIPI-compliant data signals on a third wire pair 142(1). Similarly, for the clock signals, non-MIPI-to-MIPI converter chip 140(2) converts between (i) LVDS-compliant clock signals on a first wire pair 136(2) and CMOS-compliant clock signals on a second wire pair 138(2) and (ii) MIPI-compliant clock signals on a third wire pair 142(2).

When display 150 is operating in the MIPI HS mode, the LVDS-compliant data and clock signals on wire pairs 136(1) and 136(2) are relevant, while the CMOS-compliant data and clock signals on wire pairs 138(1) and 138(2) can be ignored. Alternatively, when display 150 is operating in the MIPI LP mode, the LVDS-compliant data and clock signals can be ignored, while the CMOS-compliant data and clock signals are relevant. In this way, FPGA 130 can communicate with display 150 no matter what is the MIPI mode of display 150. Note that, for this particular application, MIPI HS mode involves only unidirectional differential SLVS200 signaling received by display 150.

Although not shown in FIG. 1, each MIPI-to-non-MIPI convert chip 120 and each non-MIPI-to-MIPI converter chip 140 comprises a state machine, a level shifter, and a level-shifting amplifier. For some applications, the provisioning of such converter chips is prohibitively expensive.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1:
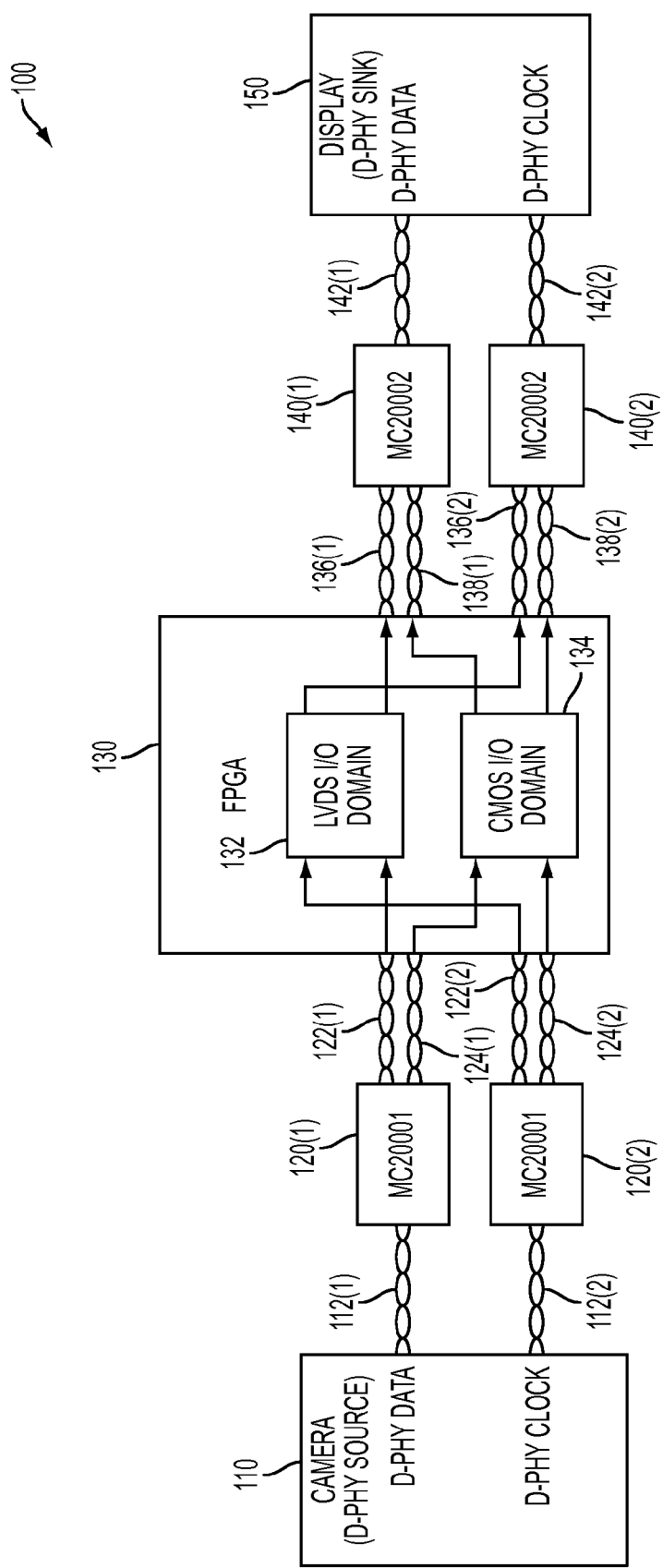
FIG. 1 shows a high-level block diagram of a prior-art electronic system having a field-programmable gate array (FPGA) that uses non-MIPI-compliant interfaces to communicate with a MIPI-compliant camera and a MIPI-compliant display.
Figure 2:
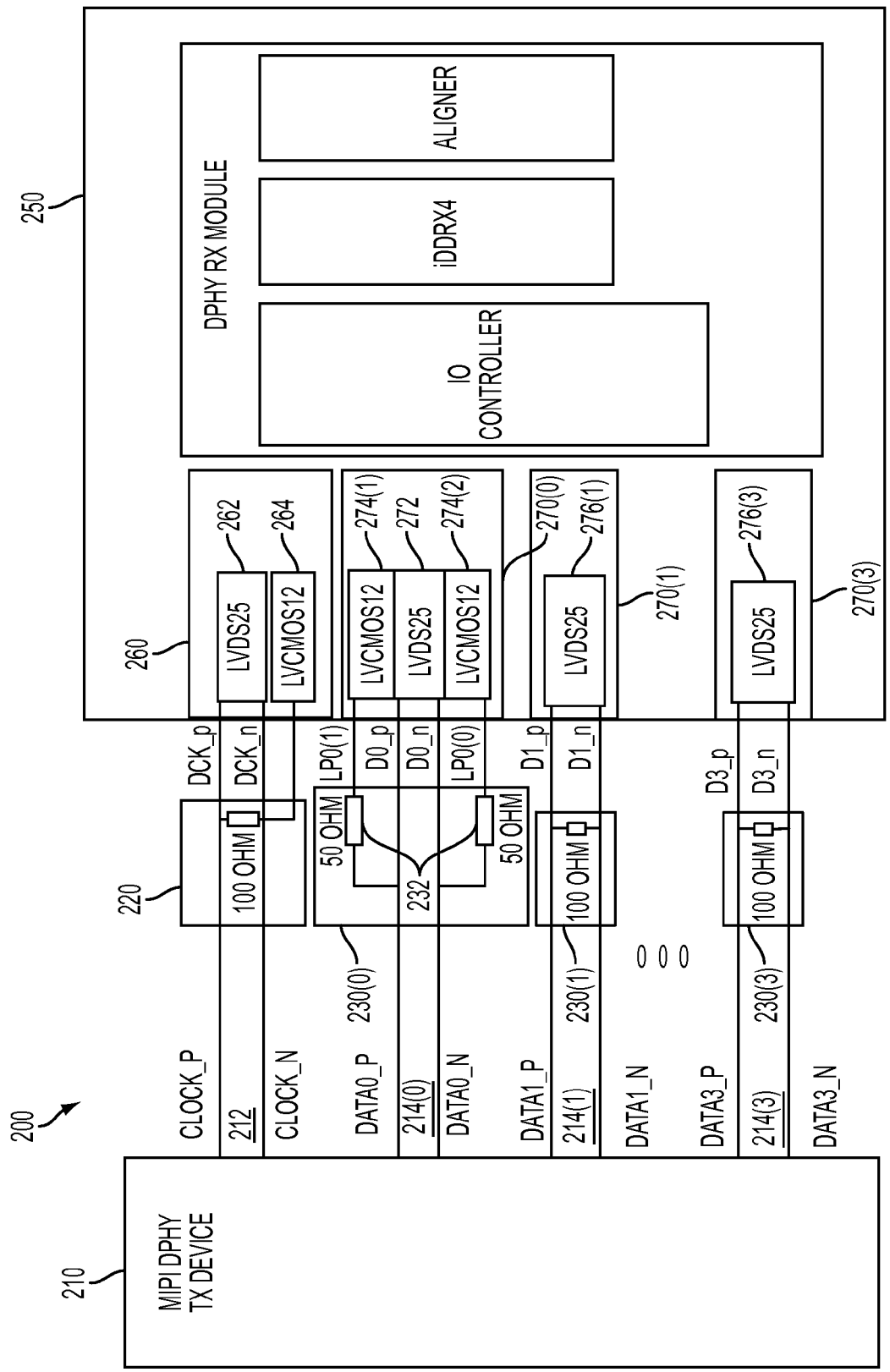
FIG. 2 shows a high-level block diagram of an electronic system that enables a MIPI-compliant transmit (TX) device, such as a camera or other video source, to communicate with an FPGA without using any MIPI-compliant I/O interfaces on the FPGA.

FIG. 2 shows a high-level block diagram of an electronic system 200 that enables a MIPI-compliant transmit (TX) device 210, such as a MIPI camera or other MIPI-compliant video source, to communicate with a field-programmable gate array (FPGA) 250 without using any MIPI-compliant I/O (input/output) interfaces on the FPGA. Depending on the particular situation, the FPGA 250 might not have any MIPI-compliant I/O interfaces or it might have some, but not have enough MIPI-compliant I/O interfaces to support communications with MIPI TX device 210, perhaps because it is also connected to other MIPI-compliant devices (not shown in FIG. 2) using its MIPI-compliant I/O interfaces. The configuration of FIG. 2 conforms to the Camera Serial Interface 2 (CSI-2) and Display Serial Interface (DSI) MIPI protocols.

As shown in FIG. 2, FPGA 250 does have various other, non-MIPI-compliant I/O interfaces, i.e., low-voltage differential signaling (LVDS) and low-voltage complementary metal oxide semiconductor (LVCMOS) interfaces, available to support communications with MIPI TX device 210. In the exemplary configuration of FIG. 2, full-bandwidth MIPI communications with MIPI TX device 210 involve one clock lane 212 and four data lanes 214(0)-214(3). To support those five two-wire clock/data lanes, five different resistor networks 220 and 230(0)-230(3) are configured to five corresponding sets 260 and 270(0)-270(3) of non-MIPI-compliant I/O interfaces in FPGA 250. Other configurations that need only support reduced-bandwidth MIPI communications having fewer than four data lanes may be configured with fewer than five sets of non-MIPI-compliant I/O interfaces, as long as there is one MIPI clock lane and at least one MIPI data lane.

In accordance with the MIPI protocols such as MIPI CSI-2 and DSI, electronic system 200 supports two different MIPI modes of communication between MIPI TX device 210 and FPGA 250: (i) MIPI unidirectional, high-speed (HS) transmit (TX) mode in which high-speed clock and data signals are transmitted from MIPI TX device 210 to FPGA 250 and (ii) MIPI bidirectional (TRX), low-power (LP) mode in which low-speed data signals are transmitted in both directions between MIPI TX device 210 and FPGA 250. Note that, during the MIPI LP mode, the two clock-lane wires (CLOCK_P and CLOCK_N) are both held at a constant, high voltage, e.g., 1.2V. In accordance with the CSI-2 and DSI MIPI protocols, electronic system 200 does not need to support high-speed data transfer from FPGA 250 to MIPI TX device 210. As such, FPGA 250 can support communications with MIPI TX device 210 using only five LVDS receivers, two LVCMOS transceivers, and one LVCMOS receiver.

In particular, to support communications with MIPI TX device 210 over the first data lane 214(0), external resistor network 230(0) and a set 270(0) of non-MIPI-compliant I/O interfaces consisting of an LVDS differential receiver 272 and two 1.2V LVCMOS transceivers 274(1)-274(2) in FPGA 250 are configured as shown in FIG. 2, where resistor network 230(0) consists of two 50-ohm resistors 232 respectively connected between the two wires of data lane 214(0) and the two 1.2V LVCMOS transceivers 274. By design, most LVDS receivers can handle a range of common-mode voltages including Vcm=200 mV.

Note that, for some FPGAs, each LVCMOS transceiver 274 has some level of internal resistance (e.g., 20 ohms). In that case, the two external resistors 232 need provide only another 30 ohms each.

In one possible configuration (not shown in FIG. 2), communications with MIPI TX device 210 over each of clock lane 212 and the other three data lanes 214(1)-214(3) could be supported by another instance of external resistor network 230(0) and another instance of set 270(0) of three non-MIPI-compliant I/O interfaces. FIG. 2, on the other hand, shows an alternative configuration that involves fewer resources.

In particular, to support communications with MIPI TX device 210 over clock lane 212, external resistor network 220 and a set 260 of non-MIPI-compliant I/O interfaces consisting of an LVDS differential receiver 262 and a 1.2V LVCMOS receiver 264 in FPGA 250 are configured as shown in FIG. 2, where resistor network 220 consists of a 100-ohm resistor connected between the two wires of clock lane 212. FPGA 250 uses the connection of clock signal CLOCK_N to 1.2V LVCMOS receiver 264 to tell which MIPI mode the clock lane is in. In one implementation, if 1.2V LVCMOS receiver 264 detects that CLOCK_N is greater than 0.6V, then FPGA 250 determines that MIPI TX device 210 is operating in the MIPI LP mode. Otherwise, FPGA 250 determines that MIPI TX device 210 is operating in the MIPI HS mode. Note that, in other configurations, clock signal CLOCK_P could be monitored instead of CLOCK_N to determine the current MIPI mode.

In addition, to support communications with MIPI TX device 210 over each of the other three data lanes 214(i), i=1-3, external resistor network 230(i) and a set 270(i) of non-MIPI-compliant I/O interfaces consisting of an LVDS differential receiver 276(i) in FPGA 250 are configured as shown in FIG. 2, where resistor network 230(i) consists of a 100-ohm resistor connected between the two wires of the data lane 214(i).

Note that some FPGAs have optional use of an internal 100-ohm termination resistor for each LVDS differential receiver. In that case, for each LVDS differential receiver that is configured during FPGA configuration to use its optional, internal 100-ohm termination resistor, the corresponding external resistor network can be omitted. Note that this option does not apply to LVDS differential receiver 272 associated with data lane 214(0).

The configuration of the sets 260 and 270(0)-270(3) of I/O interfaces in FPGA 250 is different for the MIPI HS and LP modes. FPGA 250 is configured to detect transitions between the MIPI HS and LP mode and appropriately configure the sets of I/O interfaces to support the current MIPI mode. According to the MIPI specification, the timing of the transition between MIPI HS mode and MIPI LP mode for the clock lane will differ from the timing of the transition between MIPI HS mode and MIPI LP mode for the data lanes. As such, FPGA 250 can be configured to independently detect MIPI mode transitions for the clock lane and for the data lanes.

In particular, for clock lane 212, the 1.2V LVCMOS receiver 264 uses contention detection to determine the current clock-lane MIPI mode. If the 1.2V LVCMOS receiver 264 receives a voltage of greater than 0.6V, then it determines the clock lane to be in MIPI LP mode. If the receiver receives a value of less than 0.6V, then it determines the clock lane to be in MIPI HS mode.

Since MIPI-mode transitions for the four data lanes are synchronized, it is sufficient for FPGA 250 to be configured to detect data-lane MIPI-mode transitions using only one of the four sets of I/O interfaces, i.e., set 270(0) in the exemplary configuration of FIG. 2. In particular, 1.2V LVCMOS transceivers 274(1) and 274(2) determine the current data-lane MIPI mode in one of two ways.

One way is to use clock-lane contention detection receiver 264 to determine what mode the data lanes are in. If the contention detection receiver 264 shows the clock lane 212 in LP mode, then the data lanes will already be in LP mode. If the contention detection receiver shows the clock lane in HS mode, then the data lanes will either be in HS mode or LP mode, but no useful LP mode data will be available. Whenever the clock lane is in HS mode, the 1.2V LVMCMOS transceivers 274(1) and 274(2) are configured to set their outputs low (e.g., to 0V); otherwise, the transceivers 274(1) and 274(2) are configured as inputs.

A second way to determine the current data-lane MIPI mode is to initially set the 1.2V LVCMOS transceivers 274(1) and 274(2) to input and monitor the voltage level. When an LP-to-HS transition is seen, the 1.2V LVCMOS transceivers switch to outputs and drive 0V. The HS Packet Header is then captured within the FPGA to determine how long to drive 0V on transceivers 274(1) and 274(2). After this determine time has elapsed, transceivers 274(1) and 274(2) will go back to inputs. The purpose of driving the 1.2V LVCMOS transceivers to 0V is to create a single-ended termination of 50 ohms on the P and N channels for HS mode.

After determining the current MIPI mode, FPGA 250 configures the corresponding set(s) of I/O interfaces to support that mode. For the MIPI HS mode, in order to support the large amount of data to be transmitted, clock lane 212 and all four data lanes 214(0)-214(3) are used. The primary purpose of the MIPI LP mode for MIPI CSI-2 and DSI protocols is to save power by limiting the data transitions during times of non-usage (i.e., when there is little or no data to be transmitted). A secondary purpose for the MIPI DSI protocol is that control data can additionally be transferred in LP mode on data lane 214(0). As such, data lane 214(0) is the only data lane that may need to interpret LP mode data within the FPGA.

According to the MIPI specification, the clock lane transitions from HS to LP mode after the data lane(s) transition from HS to LP mode. On the other hand, the clock lane transitions from LP to HS mode before the data lane(s) transition from LP to HS mode. Therefore, FPGA 250 can be configured to detect transitions between the HS and LP modes by monitoring only the clock lane 212.

Figure 3:
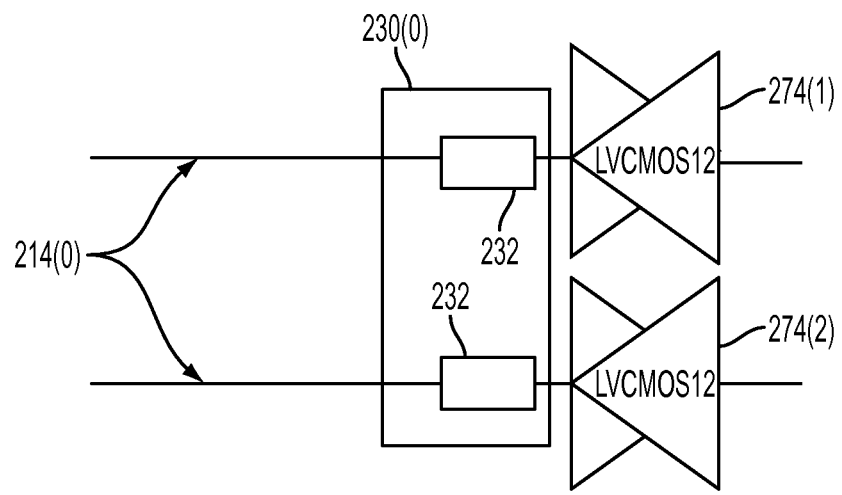
FIG. 3 shows a high-level block diagram of the equivalent circuit for data lane 214(0) of FIG. 2 when the FPGA is configured to support the MIPI bidirectional, low-power (LP) mode of a MIPI-compliant device.

For the MIPI LP mode, FPGA 250 uses (i) 1.2V LVCMOS receiver 264 of clock-lane set 260 to monitor the CLOCK_N signal for a transition to the MIPI HS mode and (ii) the two 1.2V LVCMOS transceivers 274(1) and 274(2) to support the bidirectional LP data communications with MIPI TX device 210. Resistor network 230(0) enables LVCMOS transceivers 274(1) and 274(2) to handle the MIPI LP data communications. During the MIPI LP mode, FPGA 250 simply ignores the outputs generated by the five different 2.5V LVDS receivers 262, 272, and 276(1)-276(3). The equivalent circuit between resistor network 230(0) and interface set 270(0) for the MIPI LP mode is shown in FIG. 3.

Figure 4:
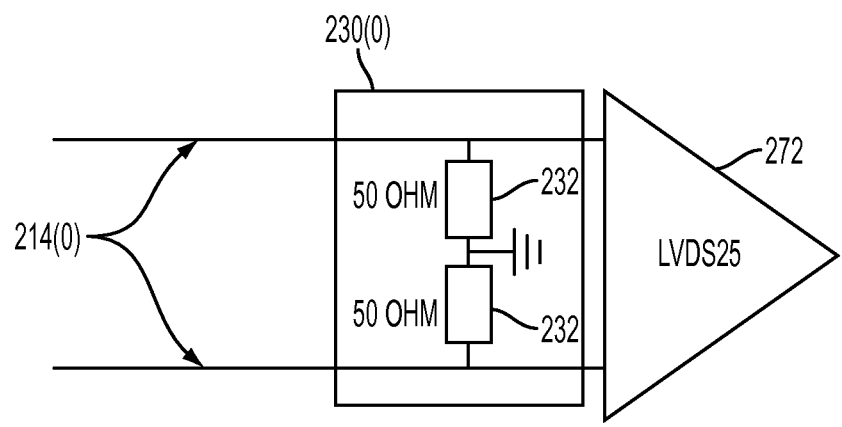
FIG. 4 shows a high-level block diagram of the equivalent circuit for data lane 214(0) of FIG. 2 when the FPGA is configured to support the MIPI unidirectional, high-speed (HS) TX mode of a MIPI-compliant device.

For the MIPI HS mode, FPGA 250 configures the two 1.2V LVCMOS transceivers 274(1) and 274(2) to be held low, which provides a single-ended 50-ohm termination on each wire of the data lane, such that the configuration of resistor network 230(0) and LVDS receiver 272 is equivalent to the configuration shown in FIG. 4. This configuration enables 2.5V LVDS receiver 272 to handle MIPI HS data signals on data lane 214(0). When clock lane 212 is in the MIPI HS mode, the signaling is below the threshold levels for 1.2V LVCMOS receiver 264, which will therefore receive a logic value of 0. Note that, when clock lane 212 is in the MIPI LP mode, 1.2V LVCMOS receiver 264 will receive a logic value of 1. Note that resistor networks 220 and 230(1)-230(3) enable LVDS receivers 262 and 276(1)-276(3) to handle MIPI HS clock and data signals on clock lane 212 and data lanes 214(1)-214(3), respectively.

Figure 5:
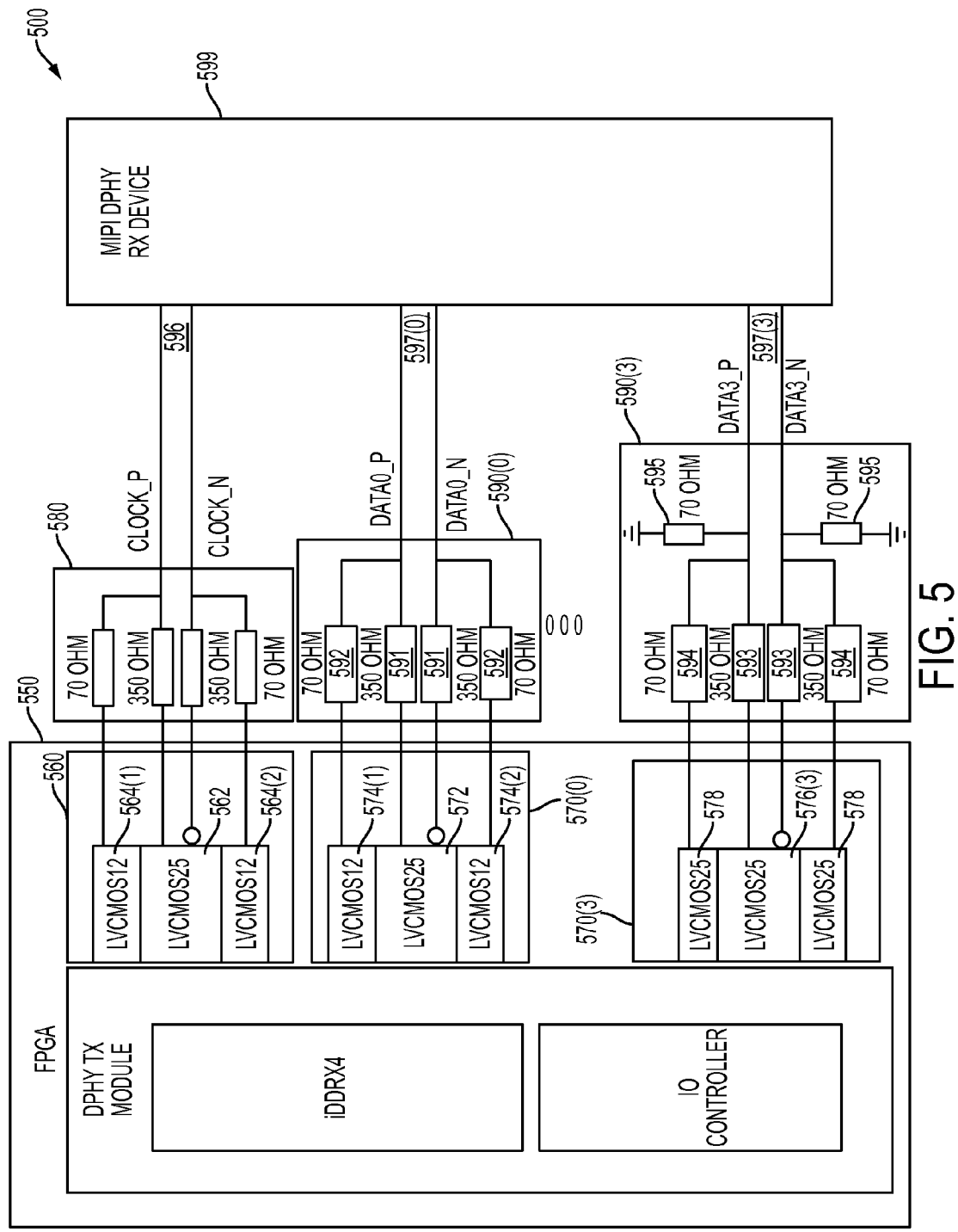
FIG. 5 shows a high-level block diagram of an electronic system that enables a MIPI-compliant receive (RX) device, such as a display or other video sink, to communicate with an FPGA without using any MIPI-compliant I/O interfaces on the FPGA.

FIG. 5 shows a high-level block diagram of an electronic system 500 that enables a MIPI-compliant receive (RX) device 599, such as a MIPI display or other MIPI-compliant video sink, to communicate with an FPGA 550 without using any MIPI-compliant I/O interfaces on the FPGA. The configuration of FIG. 5 conforms to the Camera Serial Interface 2 (CSI-2) and Display Serial Interface (DSI) MIPI protocol.

Depending on the particular situation, FPGA 550 may be FPGA 250 of FIG. 2, where the FPGA is configured to both MIPI TX device 210 of FIG. 2 and MIPI RX device 599 of FIG. 5, for example, to support the real-time transmission of video data from a MIPI camera to a MIPI display. In that case, the FPGA would conform to (i) the CSI-2 MIPI protocol to handle communications with the MIPI camera and (ii) the DSI MIPI protocol to handle communications with the MIPI display. Other situations are also possible. For example, FPGA 550 of FIG. 5 could be configured to (i) a non-MIPI camera using a conventional LVDS or parallel CMOS bus for input and (ii) a MIPI display using the configuration shown in FIG. 5. Similarly, FPGA 250 of FIG. 2 could be configured to (i) a MIPI camera using the configuration shown in FIG. 2 and (ii) a non-MIPI display using a conventional LVDS or parallel CMOS bus for output.

Like FPGA 250 of FIG. 2, FPGA 550 has non-MIPI-compliant I/O interfaces, in this case, LVCMOS interfaces, available to support communications with MIPI RX device 599. In the exemplary implementation of FIG. 5, MIPI communications with MIPI RX device 599 involve one clock lane 596 and four data lanes 597(0)-597(3). To support those five two-wire clock/data lanes, five different resistor networks 580 and 590(0)-590(3) are configured to five corresponding sets 560 and 570(0)-570(3) of non-MIPI-compliant I/O interfaces in FPGA 550.

In accordance with the DSI and CSI-2 MIPI protocols, electronic system 500 supports two different MIPI modes of communication between FPGA 550 and MIPI RX device 599: (i) MIPI unidirectional HS mode in which high-speed clock and data signals are transmitted from FPGA 550 to MIPI RX device 599 and (ii) MIPI bidirectional (TRX) LP mode in which low-speed data signals are transmitted in both directions between MIPI RX device 599 and FPGA 550. In accordance with the DSI and CSI-2 MIPI protocols, electronic system 500 does not need to support high-speed data transfer from MIPI RX device 599 to FPGA 550. As such, FPGA 550 can support communications with MIPI RX device 599 using only 2.5V or 3.3V LVCMOS transmitters and 1.2V LVCMOS transceivers.

In particular, to support communications with MIPI RX device 599 over the first data lane 597(0), resistor network 590(0) and a set 570(0) of non-MIPI-compliant I/O interfaces consisting of a 2.5V LVCMOS differential transmitter 572 and two 1.2V LVCMOS transceivers 574(1)-574(2) in FPGA 550 are configured as shown in FIG. 5, where resistor network 590(0) consists of (i) two 70-ohm resistors 592 respectively connected between the two wires of data lane 597(0) and the two 1.2V LVCMOS transceivers 574 and (ii) two 350-ohm resistors 591 respectively connected between the two wires of data lane 597(0) and the two outputs of 2.5 LVCMOS differential transmitter 572.

Note that, as before, for some FPGAs, each LVCMOS transceiver 574 has some level of internal resistance (e.g., 20 ohms). In that case, the two external resistors 592 should be reduced to compensate for the difference in internal resistance.

Communications with MIPI RX device 599 over clock lane 596 are supported by another instance of resistor network 590(0) and another instance of set 570(0) of non-MIPI-compliant I/O interfaces. In particular, communications over clock lane 596 are supported by resistor network 580 and set 560, where resistor network 580 is identical to resistor network 590(0) and set 560 is identical to set 570(0).

In one possible configuration (not shown in FIG. 5), communications with MIPI RX device 599 over each of the other three data lanes 597(1)-597(3) could be supported by another instance of resistor network 590(0) and another instance of set 570(0) of non-MIPI-compliant I/O interfaces. Some FPGAs might not have enough 1.2V LVCMOS transceivers to support such a configuration. FIG. 5 shows an alternative configuration that involves a different set of resources.

In particular, to support communications with MIPI RX device 599 over each of the other three data lanes 597(i), i=1-3, resistor network 590(i) and a set 570(i) of non-MIPI-compliant I/O interfaces consisting of a 2.5V LVCMOS differential transmitter 576 and two 2.5V LVCMOS transmitters 578 in FPGA 550 are configured as shown in FIG. 5, where resistor network 590(i) consists of (i) two 70-ohm resistors 594 respectively connected between the two wires of data lane 597(i) and the two 2.5V LVCMOS transceivers 578 of set 570(3), (ii) two 350-ohm resistors 593 respectively connected between the two wires of data lane 597(i) and the two outputs of 2.5 LVCMOS differential transmitter 576, and (iii) two 70-ohm resistors 595 respectively configured between the two wires of data lane 597(i) and ground. Note that an instance of resistor network 590(3) and interface set 570(3) could be used instead of resistor network 580 and interface set 560 for clock lane 596 is 1.2V LVCMOS resources are very limited.

As with FPGA 250 of FIG. 2, the configuration of the sets 560 and 570(0)-570(3) of I/O interfaces in FPGA 550 is different for the MIPI HS and LP modes. Since, in electronic system 500, FPGA 550 is the master, and MIPI RX device 599 is the slave, FPGA 550 determines whether the communication with MIPI RX device 599 is to be in the MIPI HS mode or the MIPI LP mode, and MIPI RX device 599 is able to detect the current MIPI mode. As such, FPGA 550 does not have to detect the MIPI mode. But FPGA 550 does have to appropriately configure the sets of I/O interfaces to support the desired MIPI mode.

For the MIPI HS mode, in order to support the large amount of data to be transmitted, clock lane 596 and one, two, three, or four data lanes 597(0)-597(3) are used. For the MIPI LP mode, all data and clock lanes go into LP mode. The only difference is that MIPI DSI data lane 597(0) needs to be bidirectional LP mode to fully support programming of the MIPI RX device 599 through MIPI Display Command Set (DCS) commands. For any data or clock lane, resistor network 590(0) or 590(3) can be used, there being advantages and disadvantages to both. Resistor network 590(0) has the advantage of fewer resistors (four) and the ability to support bidirectional LP mode, but the disadvantage of needing a separate voltage bank supporting 1.2V CMOS I/O. Resistor network 590(3) has the advantage of not needing a separate voltage bank for 1.2V CMOS I/O, but has the disadvantage of more resistors (six) and the ability to support only unidirectional LP mode. The appropriateness of each of the wide variety of possible configurations will depend on the resources available and the type of I/O support needed.

Figure 6:
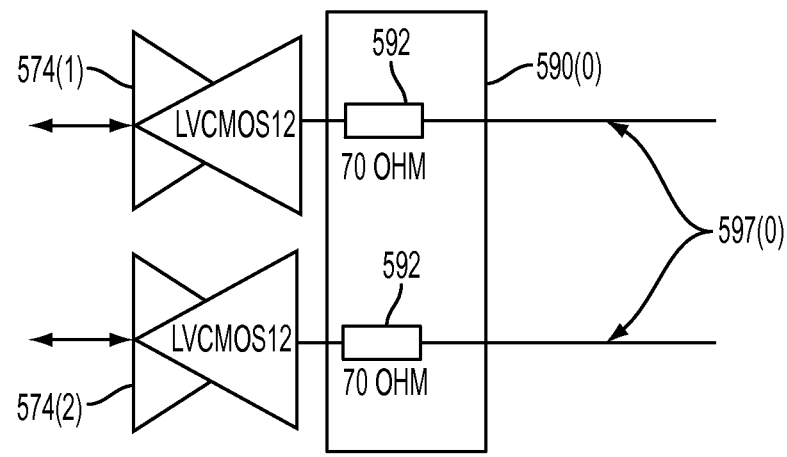
FIG. 6 shows a high-level block diagram of the equivalent circuit for data lane DH(0) of FIG. 5 when the FPGA is configured to support the MIPI bidirectional LP mode of a MIPI-compliant device.

For the MIPI LP mode, FPGA 550 configures the five 2.5V LVCMOS differential transmitters 562, 572, and 576(1)-576(3) to high-impedance mode, such that the configuration of resistor network 590(0) and the two 1.2V LVCMOS transceivers 574(1)-574(2) is equivalent to the configuration shown in FIG. 6, and the other resistor networks and pairs of 1.2V LVCMOS transceivers have analogous equivalent configurations. FPGA 550 then uses the pairs of LVCMOS transceivers 564(1) and 564(2) and 574(1) and 574(2) to support the bidirectional communications with MIPI RX device 599. Note that each LVCMOS transmitter pair 578 supports only unidirectional LP transmission. Resistor networks 580 and 590(0)-590(3) enable those LVCMOS I/O interfaces to handle the MIPI LP clock and data signals.

Figure 7:
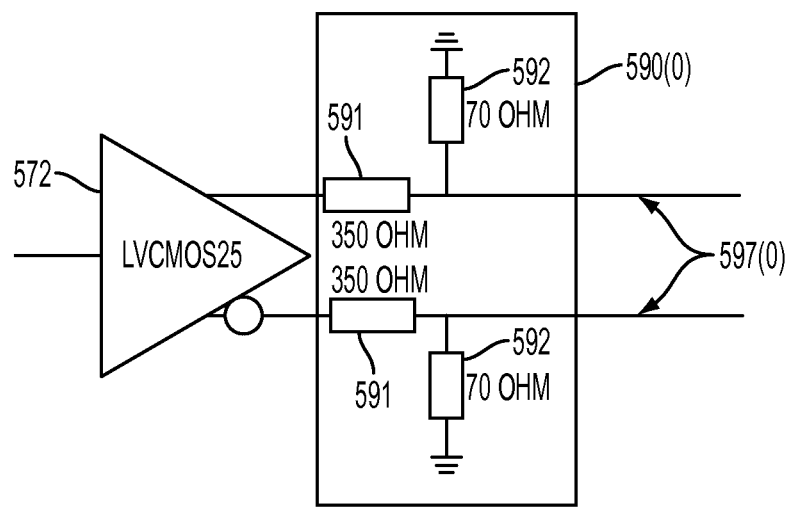
FIG. 7 shows a high-level block diagram of the equivalent circuit for data lane DH(0) of FIG. 5 when the FPGA is configured to support the MIPI HS RX mode of a MIPI-compliant device.

For the MIPI HS mode, FPGA 550 configures the all pairs of LVCMOS transceivers 564 and 574 to be held low, such that the configuration of resistor network 590(0) and 2.5V LVCMOS differential transmitter 572 is equivalent to the resistor-divider configuration shown in FIG. 7, and the other resistor networks and 2.5V LVCMOS transmitters have analogous equivalent configurations. Each resistor-divider configuration of FIG. 7 lowers the common-mode voltage to 200 mV and the differential swing to +/−100 mV, which are the characteristics of the SLVS200 signaling. These configurations enable the five 2.5V LVCMOS transmitters 562, 572, and 576(1)-576(3) to transmit MIPI HS clock/data signals. For the MIPI HS mode, FPGA 550 sets each LVCMOS pair 578 to high impedance, and LVCMOS transmitter 576(3) drives HS data. For the MIPI LP mode, FPGA 550 sets LVCMOS transmitter 576(3) to high impedance, and LVCMOS pair 578 drives LP data.

Although the present disclosure has been described in the context of MIPI communications that involve a MIPI clock lane and all four MIPI data lanes, those skilled in the art will understand that, in alternative configurations, MIPI communications may involve a MIPI clock lanes and only one, two, or three MIPI data lanes.

Although the present disclosure has been described in the context of configurations that use 1.2V and 2.5V LVCMOS I/O interfaces and 2.5V LVDS I/O interfaces, other configurations may involve other types of non-MIPI-compliant I/O interfaces. For example, one or more 3.3V LVDS I/O interfaces may be substituted for one or more of the 2.5V LVDS I/O interfaces. Similarly, one or more 3.3V LVCMOS I/O interfaces may be substituted for one or more of the 2.5V LVCMOS I/O interfaces. Those skilled in the art will understand that the resistor values may need to be changed for some of these alternative configurations. For example, if LVCMOS I/O interface 576 in FIG. 5 is implemented using a 3.3V interface instead of a 2.5V interface, then resistors 595 should be 50 ohms each instead of 70 ohms each.

The present disclosure has been described in the context of configurations that support both (i) the MIPI LP bidirectional mode and (ii) either the MIPI HS transmit mode or the MIPI HS receive mode. In some configurations, only the MIPI HS transmit mode or only the MIPI HS receive mode needs to be supported. In those cases, even fewer resources are needed. For example, referring to FIG. 2, to handle only incoming MIPI HS signals, each set of non-MIPI interfaces could be an instance of set 270(1), and each resistor network could be an instance of resistor network 230(1). Similarly, referring to FIG. 5, to provide only outgoing MIPI HS signals, each set of non-MIPI interfaces could exclude the pair of LVCMOS transceivers and ground the 70-ohm resistor.

Although the present disclosure has been described in the context of FPGAs, configurations using other types of electronic devices, such as mask-programmable field arrays (MPGAs) and application-specific integrated circuits (ASICs), having no or limited numbers of MIPI interfaces, are also possible.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes, ports, or paths may be referred to by the same name and are interchangeable for purposes here.

As used herein in reference to an element and a standard, the term "compliant" mean that the element communicates with other elements in a manner wholly or partially specified by the standard, and would be recognized by other elements as sufficiently capable of communicating with the other elements in the manner specified by the standard. The compliant element does not need to operate internally in a manner specified by the standard.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An electronic system comprising:
   an integrated circuit comprising a plurality of non-MIPI (Mobile Industry Processor Interface) interfaces;
   a clock-lane resistor network connected to a first set of one or more non-MIPI interfaces of the integrated circuit, wherein the clock-lane resistor network enables the first set to be connected, via the clock-lane resistor network, to and communicate with a MIPI-compliant device via a clock lane; and
   a first data-lane resistor network connected to a second set of one or more non-MIPI interfaces of the integrated circuit, wherein the first data-lane resistor network enables the second set to be connected, via the first data-lane resistor network, to and communicate with the MIPI-compliant device via a first data lane,
   wherein:
      the MIPI-compliant device is configured to operate in a MIPI high-speed (HS) mode or a MIPI low-speed (LP) mode;
      the second set of non-MIPI interfaces comprises first and second single-ended interfaces for communication in the MIPI LP mode and a differential interface for communication in the MIPI HS mode; and
      the first data-lane resistor network comprises:
         a first resistor connected between a first wire of the first data lane and the first single-ended interface; and
         a second resistor connected between a second wire of the first data lane and the second single-ended interface.

2. The system of claim 1, wherein the integrated circuit is a field-programmable gate array that does not have any MIPI-compliant interfaces.

3. The system of claim 1, further comprising the MIPI-compliant device.

4. The system of claim 3, further comprising a second MIPI-compliant device connected to other non-MIPI interfaces of the integrated circuit via other resistor networks to enable the integrated circuit to communicate with the second MIPI-compliant device, wherein the two MIPI-compliant devices are a video source and a video sink.

5. The system of claim 1, further comprising:
one or more additional data-lane resistor networks, each connected to an additional set of one or more non-MIPI interfaces of the integrated circuit, wherein each additional data-lane resistor network enables the corresponding additional set to be connected, via the additional data-lane resistor network, to and communicate with an additional data lane of the MIPI-compliant device.

6. The system of claim 1, wherein the integrated circuit is configured to (i) detect whether the MIPI-compliant device is operating in MIPI high-speed (HS) mode or MIPI low-power (LP) mode and (ii) configure the first and second sets to support the detected MIPI mode.

7. The system of claim 1, wherein:
the MIPI-compliant device is configured to operate in a MIPI HS transmit mode or a MIPI LP bidirectional mode;
the differential interface of the second set comprises an LVDS differential receiver and the first and second single-ended interfaces of the second set comprise first and second LVCMOS transceivers;
the first and second wires of the first data lane are respectively connected to two inputs of the LVDS differential receiver; and
the first data-lane resistor network comprises:
the first resistor connected between the first wire and the first LVCMOS transceiver; and
the second resistor connected between the second wire and the second LVCMOS transceiver.

8. The system of claim 7, wherein, when the MIPI-compliant device is operated in the MIPI HS transmit mode, then the integrated circuit holds the first and second LVCMOS transceivers low.

9. The system of claim 7, wherein, when the MIPI-compliant device is operated in the MIPI LP bidirectional mode, then the integrated circuit ignores data from the LVDS differential receiver.

10. The system of claim 7, wherein:
the first set comprises an LVDS differential receiver and an LVCMOS receiver; first and second wires of the clock lane are respectively connected to two inputs of the LVDS differential receiver;
the second wire of the clock lane is also connected to the LVCMOS receiver; and
the clock-lane resistor network comprises a third resistor connected between the first and second clock wires of the clock lane.

11. The system of claim 7, further comprising:
an additional data-lane resistor network connected to an additional set of one or more non-MIPI interfaces of the integrated circuit, wherein the additional data-lane resistor network enables the additional set to be connected, via the additional data-lane resistor network, to and communicate with the MIPI-compliant device via an additional data lane;
the additional set comprises an LVDS differential receiver;
first and second wires of the additional data lane are respectively connected to two inputs of the LVDS differential receiver; and
the additional data-lane resistor network comprises a fourth resistor connected between the first and second wires of the additional data lane.

12. The system of claim 1, wherein:
the MIPI-compliant device is configured to operate in a MIPI HS receive mode or a MIPI LP bidirectional mode;
the differential interface of the second set comprises an LVCMOS differential transmitter and the first and second single-ended interfaces of the second set comprise first and second LVCMOS transceivers; and
the first data-lane resistor network comprises:
the first resistor connected between a first wire of the first data lane and the first LVCMOS transceiver;
the second resistor connected between a second wire of the first data lane and the second LVCMOS transceiver; and
third and fourth resistors respectively connected between the first and second wires of the first data lane and two inputs outputs of the LVCMOS differential transmitter.

13. The system of claim 12, wherein, when the MIPI-compliant device is operated in the MIPI HS receive mode, then the integrated circuit holds the first and second LVCMOS transceivers low.

14. The system of claim 12, wherein, when the MIPI-compliant device is operated in the MIPI bidirectional LP mode, then the integrated circuit sets the first and second LVCMOS transceivers to high impedance.

15. The system of claim 12, further comprising:
an additional data-lane resistor network connected to an additional set of one or more non-MIPI interfaces of the integrated circuit, wherein the additional data-lane resistor network enables the additional set to be connected, via the additional data-lane resistor network, to and communicate with the MIPI-compliant device via an additional data lane;
the additional set comprises an LVCMOS differential transmitter and two LVCMOS transceivers; and
the additional data-lane resistor network comprises:
a first resistor connected between a first wire of the additional data lane and the first LVCMOS transceiver of the second set;
a second resistor connected between a second wire of the additional data lane and the second LVCMOS transceiver of the second set;
third and fourth resistors respectively connected between the first and second wires of the additional data lane and two outputs of the LVCMOS differential transmitter; and
fifth and sixth resistors respectively connected between the first and second wires of the additional data lane and ground.

16. A method of operating the integrated circuit of claim 1, the method comprising:
(a) the integrated circuit detecting whether the MIPI-compliant device is operating in MIPI high-speed (HS) mode or MIPI low-power (LP) mode; and
(b) the integrated circuit configuring the first and second sets to support the detected MIPI mode.

17. A method for configuring an integrated circuit to use non-MIPI interfaces to communicate with a MIPI-compliant device, the method comprising:
(a) connecting a clock lane of the MIPI-compliant device to a first set of one or more non-MIPI interfaces of the integrated circuit via a clock-lane resistor network; and
(b) connecting a first data lane of the MIPI-compliant device to a second set of one or more non-MIPI interfaces of the integrated circuit via a first data-lane resistor network;
wherein:
the MIPI-compliant device is configured to operate in a MIPI high-speed (HS) mode or a MIPI low-speed (LP) mode;

the second set of non-MIPI interfaces comprises first and second single-ended interfaces for communication in the MIPI LP mode and a differential interface for communication in the MIPI HS mode; and the first data-lane resistor network comprises:
 a first resistor connected between a first wire of the first data lane and the first single-ended interface; and
 a second resistor connected between a second wire of the first data lane and the second single-ended interface.

18. The method of claim 17, further comprising:
(c) the integrated circuit detecting whether the MIPI-compliant device is operating in MIPI high-speed (HS) mode or MIPI low-power (LP) mode; and
(d) the integrated circuit configuring the first and second sets to support the detected MIPI mode.

19. The system of claim 1, wherein the differential interface of the second set comprises an LVDS differential receiver.

20. The system of claim 1, wherein the first and second wires of the first data lane are respectively connected directly to two inputs of the differential interface.

21. The system of claim 1, wherein:
the differential interface comprises a differential transmitter;
the first and second single-ended interfaces of the second set comprise first and second CMOS interfaces; and
the first data-lane resistor network comprises:
 the first resistor connected between a first wire of the first data lane and the first CMOS interface;
 the second resistor connected between a second wire of the first data lane and the second CMOS interface; and
 third and fourth resistors respectively connected between the first and second wires of the first data lane and two outputs of the differential transmitter.

22. The system of claim 21, wherein the first and second CMOS interfaces are CMOS transceivers.

23. The system of claim 1, wherein:
the differential interface comprises a differential transmitter;
the first and second single-ended interfaces of the second set comprise comprises first and second CMOS transmitters; and
the first data-lane resistor network comprises:
 the first resistor connected between a first wire of the first data lane and the first CMOS transmitter;
 the second resistor connected between a second wire of the first data lane and the second CMOS transmitter;
 third and fourth resistors respectively connected between the first and second wires of the first data lane and two outputs of the differential transmitter; and
 fifth and sixth resistors respectively connected between the first and second wires of the first data lane and ground.

24. An electronic system comprising:
a field programmable gate array (FPGA) including a set of non-MIPI (Mobile Industry Processor Interface) interfaces comprising an LVDS differential receiver and first and second single-ended interfaces;
a MIPI-compliant device connected to the set of non-MIPI interfaces of the FPGA via a data lane, wherein first and second wires of the data lane are respectively connected to two inputs of the LVDS differential receiver; and
a data-lane resistor network comprising:
 a first resistor connected between the first wire of the first data lane and the first single-ended interface; and
 a second resistor connected between the second wire of the first data lane and the second single-ended interface.

25. The system of claim 24 wherein the MIPI-compliant device is further connected to the FPGA via a clock lane.

26. The system of claim 25 including a clock lane resistor network comprising a resistor connected between first and second wires of the clock lane.

27. An electronic system comprising:
a field programmable gate array (FPGA) including a set of non-MIPI (Mobile Industry Processor Interface) interfaces comprising a differential transmitter and first and second CMOS interfaces;
a MIPI-compliant device connected to the set of non-MIPI interfaces of the FPGA via a data lane; and
a data-lane resistor network comprising:
 a first resistor connected between a first wire of the first data lane and the first CMOS interface;
 a second resistor connected between a second wire of the first data lane and the second CMOS interface; and
 third and fourth resistors respectively connected between the first and second wires of the first data lane and two outputs of the differential transmitter.

28. The system of claim 27, wherein the first and second CMOS interfaces are CMOS transmitters.

29. The system of claim 27, wherein the data-lane network further includes fifth and sixth resistors respectively connected between the first and second wires of the first data lane and ground.

30. The system of claim 27, wherein the MIPI-compliant device is further connected to the FPGA via a clock lane.

* * * * *